Patented Oct. 28, 1947

2,429,872

UNITED STATES PATENT OFFICE 2,429,872

LUTINGS

William Richard Downs, Louisville, Ky., assignor to Corhart Refractories Company, Louisville, Ky., a corporation of Delaware No Drawing. Application June 10, 1943, Serial No. 490,355

15 Claims. (Cl. 106—65)

This invention relates to a mortar for certain uses, such as luting the joints of the blocks or tiles forming the walls, etc., of molten baths used in the electrolytic production of magnesium. The temperature of the molten bath is between 700 and 800° C. and the joints should be impervious and perfect. A perfect mortar for the purposes named must have all of the following properties:

1. Good troweling properties, i. e., workability in application to the joints.
2. Quick development of cold strength so that the weight of the tile and of successive layers of tile may be borne without distortion of the mortar joints below, and so that lateral movement of the tile during setting up will not occur.
3. Ability to mature at temperatures no higher than those required for normal operation of the cell.
4. Low porosity when cured, to prevent seepage of the electrolyte.
5. Small shrinkage on curing so that the tile will not shift and develop cracks in the mortar.
6. Ability definitely to bond with and adhere to the tile on curing.
7. High cohesive strength so that expansion and contraction will not permit parting in the mortar itself.
8. Ability to withstand continuously the high temperature of the molten bath without creep or distortion.
9. Resistance to chemical attack from the molten electrolyte.

While it would not be difficult for one skilled in the art to produce a mortar with any one of these properties individually, several of them appear mutually incompatible and mortars generally sacrifice one or more properties in order to get another which is considered more essential. Thus good workability is often obtained with plastic clay which gives high shrinkage on firing, and low porosity is often associated either with high firing or high shrinkage. Also low shrinkage and high resistance to chemical attack is often secured by mortars with finely ground silica as base, but silica base mortars are non-vitrifiable at cell temperatures and possess therefore high porosity which results in seepage of the cell contents through the mortared joints. At any rate I know of no mortar, commercial or proposed, which would not fail on several of the above counts, despite the pressing need in this service.

After many months of searching I have succeeded in producing in one mortar a composition having all of the above properties. Because of the number of ingredients it is not yet certain just what roles each plays but sufficient work has been done on the mixture discovered to permit specification for the proper selection and preparation of the ingredients in order to produce a practical mortar and this application is directed thereto.

My improved mortar in its raw state comprises:

1. Grains of highly refractory material having negligible porosity and, even when heated to a high temperature, good resistance to chemical corrosion. Part of the grains at least have as integral parts thereof a highly aluminous glass pre-bonded to crystals. Such grains may be obtained by grinding the cast product obtained by melting a batch containing alumina and silica in such proportions that the cooled product contains crystallized corundum and mullite and a highly aluminous glass, and grinding the cooled product to a fineness to pass a screen 60 mesh to the inch. The use of coarser material does not permit making thin joints. In the grinding operation a variety of finer sizes are normally produced which contribute to efficient packing of pore space between larger grains. There is an advantage in having a fair fraction also of very fine material which is refractory. This may be conveniently supplied also by commercial zircon which is obtainable in quantity, milled to pass a 325 mesh screen. I have found such fine refractory material even though largely crystalline to contribute definitely to the plasticity of a mix and to improve workability.

2. A cold set bond. For this purpose ordinary sodium silicate ($Na_2SiO_3$) is quite satisfactory. I normally prefer to add this as the 38° Baumé solution to the remainder of the mortar (dry) when ready to use, since the proper amount of water for good workability is thus simultaneously added. Sodium silicate having a ratio of 1 part $Na_2O$ to 3.2 $SiO_2$ has given good results.

3. An agent for accelerating the cold set. A small amount of sodium fluosilicate may be used for this purpose which presumably acts by hydrolysis to inactivate the water of plasticity.

4. A material which will mature at operating temperatures with a minimum of fluxing action on the refractory grains and act as a binder. Such a binder when produced will of course also incorporate the low temperature binder, $Na_2SiO_3$ and $Na_2SiF_6$. To produce this binder material I use a glass having the ability after reaction with the other ingredients to give good adherence and low porosity. Several commercial glasses will react and mature in the desired temperature range but produce varying degrees of adherence and porosity. For the best results, I have found it desirable to use a borate glass such as one of the B glasses of the Sullivan & Taylor Patent No. 1,304,623. I have found 60 mesh material satisfactory but it is better to ball mill the glass to a flour to permit more intimate mixture with the refractory ingredients to be bonded.

5. A porosity modifier. I have found that the addition of a small amount of alkali fluoride, such as commercial grade of sodium fluoride powder, has a marked effect in decreasing the porosity of the mortar after maturing. At the maturing temperatures this is also incorporated in the binder increasing the fluorine content and presumably lowering the viscosity to permit greater pore penetration and filling.

The following are given as examples of batches which I have prepared and tested with good results.

Batch A

| | Parts |
|---|---|
| (1) Refractory mixture consisting of: Corundum - mullite - glass grains 126 parts Milled zircon 14 parts | 140 |
| (2) Na₂SiO₃ in water (38° Bé.) | 60 |
| (3) Na₂SiF₆ | 4 |
| (4) Glass fines as above | 60 |
| (5) NaF | 10 |

Batch B

| | Parts |
|---|---|
| (1) Refractory mixture consisting of: Corundum - mullite - glass grains 108 parts Milled zircon 12 parts | 120 |
| (2) Na₂SiO₃ in water (38° Bé.) | 60 |
| (3) Na₂SiF₆ | 4 |
| (4) Glass fines | 80 |
| (5) NaF | 10 |

Batch C

| | Parts |
|---|---|
| (1) Refractory mixture consisting of: Corundum - mullite - glass grains 200 parts Milled zircon 20 parts | 220 |
| (2) Na₂SiO₃ in water (38° Bé.) | 140 |
| (3) Na₂SiF₆ | 8 |
| (4) Glass fines | 175 |
| (5) NaF | 20 |

A proper ratio of binder glass to the refractory grains is of importance. A lower ratio than any of the above that is say one in which the glass binder is less than 42% of the highly refractory material, results in porosity in the cured mortar and poorer adherence while if the glass is increased appreciably to over 80% of the highly refractory material, crazing sets in, the refractoriness decreases and the resistance to chemical attack is lowered.

In the preparation and use of my improved mortar the several ingredients as above named are thoroughly mixed, or all the ingredients except sodium silicate may be mixed dry and the sodium silicate then added as the 38° Baumé solution to give the right troweling consistency for good workability. The alkali silica ratio of the sodium silicate should be selected from the commercial brands of that substance in accordance with known practice to give this troweling consistency. As is known (Mellor, "Inorganic and Theoretical Chemistry," vol. 6, page 320) the viscosity of the silicate increases as the silica ratio increases in respect to the alkali. The mortar is applied in the normal way and quickly sets to give sufficient cold strength to permit continuous construction of brick work. The mortar may then be matured in situ after being allowed to dry at room temperature (or elimination of moisture may be hastened by drying with a current of hot air), by introducing molten magnesium chloride and starting the cell operation, the level of the electrolyte being gradually raised to its full height. In this way the lower levels of mortared masonry are cured first before upper levels are subjected to the full action of the electrolyte. If this is done the mortar will mature without injury from contact with the electrolyte. Alternatively, in order to cure the mortar in joints of brick work, the latter, after the preliminary air drying schedule, may be subjected to artificial heating by use of fuel fed flame or electrical heating means until temperatures of operation are attained.

While my improved mortar has been illustrated in its application to baths used in the electrolytic production of magnesium it may obviously be employed to advantage wherever analogous conditions demand similar properties.

Having thus described my invention what I claim is:

1. A refractory mortar maturing at a temperature of less than 800° C., containing grains of highly refractory material having negligible porosity and high resistance to chemical corrosion, each grain having as integral parts thereof highly aluminous glass pre-bonded to refractory crystals, fines of a binder maturing at the operating temperature of the mortar, and an alkali fluoride reacting at maturing temperature with the binder.

2. A refractory mortar maturing at a temperature of less than 800° C., containing grains of highly refractory material having negligible porosity and high resistance to chemical corrosion, each grain having as integral parts thereof highly aluminous glass pre-bonded to refractory crystals, fines of a binder maturing at the operating temperature of the mortar, and an alkali fluoride reacting at maturing temperature with the binder, the binder amounting to between 42% and 80% of the highly refractory material.

3. A refractory mortar maturing at a temperature of less than 800° C., containing refractory grains each of which consists of interlocking crystals of mullite and corundum united with a glassy matrix, fines of a binder maturing at the operating temperature of the mortar and an alkali fluoride reacting at maturing temperature with the binder.

4. A refractory mortar maturing at a temperature of less than 800° C., containing grains of highly refractory material having negligible porosity and high resistance to chemical corrosion, each grain having as integral parts thereof, a highly aluminous glass pre-bonded to refractory crystals, a binder consisting of fines of a boro-silicate glass and an alkali fluoride reacting at maturing temperature with the binder.

5. A refractory mortar maturing at a temperature of less than 800° C., containing grains of highly refractory material having negligible porosity and high resistance to chemical corrosion, each grain having as integral parts thereof a highly aluminous glass pre-bonded to refractory crystals, a binder consisting of fines of a boro-silicate glass and an alkali fluoride reacting at maturing temperature with the binder, and a silicofluoride solution.

6. A refractory mortar maturing at a temperature of less than 800° C., containing grains of a highly refractory material, consisting of interlocking crystals of mullite and corundum bonded with a glassy matrix, a binder consisting of fines of a boro-silicate glass, such binder amounting to between 42% and 80% of the highly refractory material, an alkali fluoride reacting at maturing temperature with the binder and a silicofluoride solution.

7. A refractory mortar containing grains composed of a highly refractory crystalline material having negligible porosity and high resistance to chemical corrosion and a highly aluminous glass prebonded to the refractory crystals, and a heat developed binder for the said grains, comprising glass, the binder maturing at a temperature between 700 and 800° C.

8. A refractory mortar containing grains composed of a highly refractory crystalline material having negligible porosity and a high resistance to chemical corrosion and a highly aluminous glass prebonded to the refractory crystals, and a heat developed binder for the said grains, comprising glass, the binder maturing at a temperature between 700 and 800° C., the binder amounting to 42% to 80% of the refractory material.

9. A refractory mortar containing grains composed of interlocking crystals of corundum and mullite united with a glassy matrix and a heat developed binder for said grains, comprising glass, the binder maturing at a temperature between 700 and 800° C.

10. A refractory mortar containing grains composed of interlocking crystals of corundum and mullite united with a glassy matrix, and a binder of a boro-silcate glass.

11. A batch for a refractory mortar containing grains composed of a highly refractory crystalline material having negligible porosity and high resistance to chemical corrosion and a highly aluminous glass prebonded to the refractory crystals, and a binder of a glass for the said grains, the binder maturing at a temperature between 700 and 800° C., and an alkali fluoride.

12. A batch for a refractory mortar containing grains composed of a highly refractory crystalline material having negligible porosity and high resistance to chemical corrosion and a highly aluminous glass prebonded to the refractory crystals, and a binder of a glass for the said grains, the binder maturing at a temperature between 700 and 800° C., an alkali fluoride, and sodium silicate solution.

13. A batch for a refractory mortar containing grains composed of a highly refractory crystalline material having negligible porosity and high resistance to chemical corrosion and a highly aluminous glass prebonded to the refractory crystals, and a binder of a glass for the said grains, the binder maturing at a temperature between 700 and 800° C., a silico fluoride and an alkali fluoride.

14. A batch for a refractory mortar containing grains composed of a highly refractory crystalline material having negligible porosity and a high resistance to chemical corrosion and a highly aluminous glass prebonded to the refractory crystals, and a binder of a glass for the said grains, the binder maturing at a temperature between 700 and 800° C., a silico fluoride, an alkali fluoride, and sodium silicate solution.

15. A refractory mortar containing grains composed of interlocking crystals of corundum and mullite united by a highly aluminous glassy matrix, and a binder of a glass for the said grains, the binder maturing at a temperature between 700 and 800° C. and an alkaline fluoride.

WILLIAM RICHARD DOWNS.

REFERENCES CITED

The following references are of record in the file of this patent:

UNITED STATES PATENTS

| Number | Name | Date |
| --- | --- | --- |
| 1,867,444 | Dietz et al. | July 12, 1932 |
| 1,883,675 | Frank et al. | Oct. 18, 1932 |
| 1,973,731 | Snell | Sept. 18, 1934 |
| 1,973,732 | Snell | Sept. 18, 1934 |
| 2,065,389 | Mohrle | Dec. 22, 1936 |
| 2,240,393 | Dietz | Apr. 29, 1941 |
| 2,195,949 | Wood | Apr. 2, 1940 |
| 2,195,950 | Wood | Apr. 2, 1940 |

FOREIGN PATENTS

| Number | Country | Date |
| --- | --- | --- |
| 517,672 | Great Britain | 1940 |
| 849,016 | France | 1939 |
| 568,538 | Germany | 1933 |
| 575,240 | Germany | 1933 |
| 702,739 | Germany | 1941 |
| 807,615 | France | 1936 |